(12) United States Patent
Holm

(10) Patent No.: US 11,596,132 B2
(45) Date of Patent: Mar. 7, 2023

(54) TRANSFER ASSEMBLY AND SYSTEM FOR AQUACULTURE

(71) Applicant: ATLANTIC SAPPHIRE IP, LLC, Miami, FL (US)

(72) Inventor: Thue Holm, Hvide Sande (DK)

(73) Assignee: ATLANTIC SAPPHIRE IP, LLC, Miami, FL (US)

( * ) Notice: Subject to any disclaimer, the term of this patent is extended or adjusted under 35 U.S.C. 154(b) by 363 days.

(21) Appl. No.: 16/990,271

(22) Filed: Aug. 11, 2020

(65) Prior Publication Data

US 2021/0127646 A1  May 6, 2021

Related U.S. Application Data

(63) Continuation-in-part of application No. 16/916,986, filed on Jun. 30, 2020, now Pat. No. 11,484,015, (Continued)

(51) Int. Cl.
*A01K 63/04* (2006.01)
*C02F 9/00* (2006.01)
(Continued)

(52) U.S. Cl.
CPC .......... *A01K 63/045* (2013.01); *A01K 63/006* (2013.01); *A01K 63/04* (2013.01);
(Continued)

(58) Field of Classification Search
CPC .... A01K 63/045; A01K 63/042; A01K 63/04; A01K 63/047; A01K 63/00;
(Continued)

(56) References Cited

U.S. PATENT DOCUMENTS 2,643,481 A  6/1953  Ederer
3,200,949 A  8/1965  Aulich
(Continued)

FOREIGN PATENT DOCUMENTS

CN  102329055  1/2012
GB  2464686  4/2010
(Continued)

OTHER PUBLICATIONS

Lindholm-Lehto et al., Depuration of Geosmin and 2 mehtylisoborneol-induced off-flavors in recirculation aquacultre system (RAS) farmed European whitefish coregonus lavaretus, Jul. 10, 2019.
(Continued)

*Primary Examiner* — Yvonne R Abbott-Lewis
(74) *Attorney, Agent, or Firm* — Malloy & Malloy, P.L.

(57) ABSTRACT

A system for transferring marine life within an aquaculture facility including a plurality of segregated storage facilities each containing water for marine life, maintained within a predetermined temperature range and supported at independent ground levels. The storage facilities are successively disposed and structured to contain marine life at different stages of growth. A transfer assembly includes a path of fluid flow interconnecting successive ones of said plurality of storage facilities in fluid communication with one another, wherein at least a majority of a length of said path of fluid flow is disposed beneath the independent ground levels at a predetermined depth, which is sufficient to facilitate maintenance of the path of fluid flow within the predetermined temperature range, via geothermal cooling.

20 Claims, 2 Drawing Sheets

Related U.S. Application Data which is a continuation-in-part of application No. 15/867,100, filed on Jan. 10, 2018, now Pat. No. 10,034,461, which is a continuation of application No. 15/157,296, filed on May 17, 2016, now Pat. No. 10,694,722.

(60) Provisional application No. 62/975,410, filed on Feb. 12, 2020, provisional application No. 62/165,144, filed on May 21, 2015.

(51) Int. Cl.
| | |
|---|---|
| A01K 63/00 | (2017.01) |
| B01D 21/24 | (2006.01) |
| B01D 21/01 | (2006.01) |
| C02F 1/32 | (2023.01) |
| C02F 3/30 | (2023.01) |
| C02F 101/16 | (2006.01) |
| C02F 103/20 | (2006.01) |
| C02F 101/10 | (2006.01) |
| C02F 3/04 | (2023.01) |
| C02F 3/08 | (2023.01) |
| C02F 1/00 | (2023.01) |
| C02F 1/66 | (2023.01) |
| C02F 11/14 | (2019.01) |
| C02F 11/123 | (2019.01) |

(52) U.S. Cl.
CPC .......... *A01K 63/042* (2013.01); *A01K 63/047* (2013.01); *B01D 21/01* (2013.01); *B01D 21/2455* (2013.01); *C02F 1/325* (2013.01); *C02F 3/305* (2013.01); *C02F 9/00* (2013.01); *C02F 1/001* (2013.01); *C02F 1/32* (2013.01); *C02F 1/66* (2013.01); *C02F 3/04* (2013.01); *C02F 3/085* (2013.01); *C02F 11/123* (2013.01); *C02F 11/14* (2013.01); *C02F 2101/105* (2013.01); *C02F 2101/16* (2013.01); *C02F 2103/20* (2013.01); *C02F 2209/005* (2013.01); *C02F 2209/02* (2013.01); *C02F 2209/03* (2013.01); *C02F 2209/05* (2013.01); *C02F 2209/06* (2013.01); *C02F 2209/22* (2013.01); *C02F 2209/42* (2013.01); *C02F 2301/046* (2013.01); *C02F 2303/04* (2013.01); *C02F 2303/16* (2013.01)

(58) Field of Classification Search
CPC ...... A01K 63/006; A01K 61/00; A01K 61/10; B01D 21/01; C02F 2209/00; C02F 2301/046; C02F 1/001
USPC ....... 119/215, 200, 227, 226, 231, 259, 260, 119/211, 224, 230, 245, 261, 51.04; 210/605
See application file for complete search history.

(56) References Cited

U.S. PATENT DOCUMENTS

| | | | |
|---|---|---|---|
| 3,771,492 A * | 11/1973 | Doherty | A01K 63/04 |
| | | | 119/225 |
| 3,832,720 A | 8/1974 | Cook | |
| 4,009,782 A | 3/1977 | Grimshaw | |
| 4,052,960 A | 10/1977 | Birkbeck et al. | |
| 4,067,809 A | 1/1978 | Kato | |
| 4,394,259 A | 7/1983 | Benny et al. | |
| 4,607,595 A | 8/1986 | Busot et al. | |
| 4,728,438 A | 3/1988 | Featherstone et al. | |
| 4,915,059 A | 4/1990 | Long | |
| 4,966,096 A | 10/1990 | Adey | |
| 5,038,715 A | 8/1991 | Fahs, II | |
| 5,123,195 A | 6/1992 | Hawkins | |
| 5,317,645 A | 5/1994 | Perozek et al. | |
| 5,385,428 A | 1/1995 | Taft, 3rd et al. | |
| 5,540,521 A * | 7/1996 | Biggs | A01K 63/00 |
| | | | 405/74 |
| 5,659,977 A | 8/1997 | Jensen et al. | |
| 5,732,654 A | 3/1998 | Perez et al. | |
| 5,961,831 A | 10/1999 | Lee et al. | |
| 5,978,315 A | 11/1999 | Molaug | |
| 5,979,362 A * | 11/1999 | McRobert | A01K 63/10 |
| | | | 119/227 |
| 6,041,738 A | 3/2000 | Hemauer et al. | |
| 6,099,879 A | 8/2000 | Todd, Jr. | |
| 6,206,612 B1 | 3/2001 | Meyer | |
| 6,317,385 B1 | 11/2001 | Hedgepeth | |
| 6,382,134 B1 | 5/2002 | Gruenberg et al. | |
| 6,443,098 B1 | 9/2002 | Blyth et al. | |
| 6,447,681 B1 * | 9/2002 | Carlberg | C02F 3/327 |
| | | | 210/219 |
| 6,474,264 B1 | 11/2002 | Grimberg et al. | |
| 6,499,431 B1 | 12/2002 | Lin et al. | |
| 6,722,314 B1 * | 4/2004 | Crisinel | A01K 63/042 |
| | | | 119/245 |
| 6,902,675 B2 | 6/2005 | Kelly et al. | |
| 6,932,025 B2 | 8/2005 | Massingil et al. | |
| 6,986,323 B2 | 1/2006 | Ayers | |
| 6,988,394 B2 | 1/2006 | Shedd et al. | |
| 7,001,519 B2 * | 2/2006 | Linden | C02F 3/302 |
| | | | 210/906 |
| 7,082,893 B2 * | 8/2006 | Schreier | C02F 3/302 |
| | | | 119/260 |
| 7,462,284 B2 | 12/2008 | Schreier et al. | |
| 7,594,779 B2 | 9/2009 | Hildstad et al. | |
| 8,117,992 B2 * | 2/2012 | Parsons | A01K 63/00 |
| | | | 119/226 |
| 8,141,515 B2 | 3/2012 | Nien | |
| 8,506,811 B2 | 8/2013 | Bradley et al. | |
| 8,633,011 B2 | 1/2014 | Palmer et al. | |
| 9,637,402 B2 * | 5/2017 | Tal | C02F 3/2846 |
| 9,756,838 B2 * | 9/2017 | Kunitomo | C02F 1/78 |
| 10,034,461 B2 * | 7/2018 | Holm | C02F 3/305 |
| 10,660,315 B1 | 5/2020 | Alcantar et al. | |
| 10,694,722 B1 | 6/2020 | Holm et al. | |
| 10,748,278 B2 | 8/2020 | Brubacher | |
| 10,959,411 B2 * | 3/2021 | Holm | A01K 61/95 |
| 11,425,895 B2 | 8/2022 | Holm et al. | |
| 2003/0070624 A1 | 4/2003 | Zohar | |
| 2003/0104353 A1 | 6/2003 | Brielmeier et al. | |
| 2003/0121859 A1 | 7/2003 | Kelly et al. | |
| 2004/0168648 A1 * | 9/2004 | Ayers | A01K 63/04 |
| | | | 119/200 |
| 2004/0244715 A1 | 12/2004 | Schreier et al. | |
| 2005/0211644 A1 | 9/2005 | Goldman | |
| 2007/0221552 A1 | 9/2007 | Denney | |
| 2007/0242134 A1 | 10/2007 | Zernov | |
| 2008/0000821 A1 * | 1/2008 | Drewelow | C02F 1/20 |
| | | | 210/150 |
| 2008/0223788 A1 * | 9/2008 | Rimdzius | C02F 9/00 |
| | | | 202/176 |
| 2009/0145368 A1 * | 6/2009 | Brauman | A01K 61/80 |
| | | | 119/224 |
| 2010/0236137 A1 * | 9/2010 | Wu | C10L 1/19 |
| | | | 554/8 |
| 2010/0269761 A1 * | 10/2010 | Nien | A01K 63/04 |
| | | | 119/261 |
| 2011/0250604 A1 | 10/2011 | Cane et al. | |
| 2011/0258915 A1 | 10/2011 | Subhadra | |
| 2012/0103271 A1 | 5/2012 | Kong | |
| 2012/0125940 A1 | 5/2012 | Wright et al. | |
| 2012/0184001 A1 | 7/2012 | Stephen et al. | |
| 2013/0098303 A1 | 4/2013 | Jones | |
| 2013/0319342 A1 | 12/2013 | Musser | |
| 2013/0327709 A1 * | 12/2013 | Stroot | C02F 3/2893 |
| | | | 210/151 |
| 2014/0261213 A1 | 9/2014 | Stiles, Jr. et al. | |
| 2015/0230439 A1 | 8/2015 | Harwood | |
| 2015/0250113 A1 | 9/2015 | Shoham et al. | |
| 2015/0256747 A1 | 9/2015 | Grotto et al. | |

(56) References Cited

U.S. PATENT DOCUMENTS

| | | |
|---|---|---|
| 2015/0342161 A1 | 12/2015 | Sheriff |
| 2015/0366173 A1 | 12/2015 | Myers |
| 2016/0356756 A1 | 12/2016 | Covi |
| 2017/0260546 A1 | 9/2017 | Qimron et al. |
| 2018/0125041 A1* | 5/2018 | Holm .................. A01K 63/045 |
| 2019/0008126 A1 | 1/2019 | Shishehchian |
| 2019/0071336 A1 | 3/2019 | Greenwald et al. |
| 2019/0082661 A1 | 3/2019 | Lahav et al. |
| 2019/0135393 A1 | 5/2019 | Pieterkosky |
| 2019/0141964 A1 | 5/2019 | Perslow et al. |
| 2019/0169046 A1 | 6/2019 | Holm |
| 2019/0200584 A1 | 7/2019 | Holm |
| 2020/0396970 A1 | 12/2020 | Holm et al. |
| 2021/0137082 A1 | 5/2021 | Holm |
| 2021/0195874 A1 | 7/2021 | Holm et al. |
| 2021/0227807 A1 | 7/2021 | Holm et al. |
| 2021/0235010 A1 | 7/2021 | Wallace et al. |
| 2021/0274758 A1 | 9/2021 | Holm et al. |
| 2021/0275604 A1 | 9/2021 | Holm |
| 2021/0278378 A1 | 9/2021 | Holm |

FOREIGN PATENT DOCUMENTS

| | | |
|---|---|---|
| JP | H01112935 | 5/1989 |
| WO | WO200241703 | 5/2002 |
| WO | WO2006042371 | 4/2006 |
| WO | WO2008094132 | 8/2008 |
| WO | WO2016154602 | 9/2016 |
| WO | WO2017002081 | 1/2017 |
| WO | WO017153986 | 9/2017 |
| WO | WO2018184029 | 4/2018 |
| WO | WO2018169412 | 9/2018 |
| WO | WO2021162847 | 8/2021 |
| WO | WO2021178080 | 9/2021 |
| WO | WO2021178431 | 9/2021 |
| WO | WO2021216225 | 10/2021 |
| WO | WO2021221745 | 11/2021 |

OTHER PUBLICATIONS

Sompong et al., Microbial Degradation of musty odor in aquaculture pond, International Journal of Agricultural Technology, Dec. 1, 2018.

Tucker et al., Managing Off-Flavor Problems in Pond-Raised Catfish, SRAC Publication, Oct. 5, 2018.

Van Der Heile Tony et al., Composition, Treatment and Use of Saline Gorundwater for Aquaculture in the Netherlands, World Aquaculture, Jun. 2014, pp. 23-27, Nov. 2014.

Garcia-Bencochea, Jose I. et al., Deep Well Disposal of Waste Waters in Saline Aquifers of South Florida, Abstract, American Geophysical Union Water Resources Research, Oct. 1970, 1 page, Oct. 1970.

Howard, Mark R., Down the Drain, Florida Trend, Jan. 1, 2000, hhtp://www.floridatrend.com/print/article/13274, 2 Pages, Jan. 1, 2000.

Gorman J. et al., Economic Feasibility of Utilizing West Alabama Saline Ground Water to Produce Florida Pompano and Hybrid Striped Bass in a Recirculating Aquaculture System, Alabama Agricultural Experiment Station, Auburn University, 19 Pages, Dec. 1, 2009.

Sharrer, Mark J. et al. Evaluation of Geotextile Filtration Applying Coagulant and Flocculant Amendments for Aquaculture, biosolids dewatering and phosphorus removal, Aquacultural Engineering, vol. 40, Issue 1, Jan. 2009, 10 Pages, <URL:https://www.sciencedirect.com/science/article/pii/S0144860908000678> (Accessed Dec. 4, 2017), Jan. 1, 2009.

Haberfeld, Joseph, Letter RE First Request for Additional Information (RAI), Florida Department of Environmental Protection, 6 pages, Jun. 4, 2013.

Storro, Gaute, Investigations of Salt groundwater at Akvaforsk Research Institute, Sunndalsora, Norway, Geological Survey of Norway, NGU-rapport 93.029, 1993, 11 pages, Jan. 1, 1993.

Milchman, Jon, Construction Clearance Permit Application, Florida Departmewnt of Environmental Protection (FDEP), 5 pages, May 12, 2013.

Sun Min et al., Models for estimating feed intake in aquaculture, a review, abstract, Computers and Electornics in Agriculture, vol. 127, <URL:http://www.sciencedirect.com/science/article/pii/S0168169916304240> (Accessed Dec. 4, 2017), 4 pages, Sep. 2016.

Notice of Draft Remit, South Dade News Leader, Hoestead , Miade-Dade County, Florida, Sep. 13, 2013, 1 Page, Sep. 13, 2013.

South Dade News Leader, Notice of Intent, Homestead , Miade-Dade County, Florida, Oct. 18, 2013, 1 pages, Oct. 18, 2013.

Notice of Permit, Florida Department of Environmental Protection, 18 pages, Nov. 4, 2013.

Small, Brian et al., On the Feasibility of Establishing a Saline Aquaculture Industry in Illinois, Illinois Sustainable Technology Center [online] <URL:http://www.istc.illinois.edu/info/library_docs/TR/TR051.pdf>46 Pages, Mar. 2014.

Akva Group, Recirculation Systems, 6 pages, <URL:http://www.akvagroup.com/prodiicts/land-based-aquaculture/recirculation systems> (Accessed Dec. 4, 2017).

State of Florida, Well Completion Report, Feb. 2015, 23 Pages, Feb. 2015.

Water Source, University of Alaska, Fairbanks, School of Fisheries & Ocean Sciences, 53 Pages, <URL:hhtps://www.sfos.uaf.edu/fitc/teaching/courses/fish336/materials/FISH%20336%20Letc%2031%20Water%20Quality%203.pdf> (Accessed, Dec. 4, 2017.

* cited by examiner

TRANSFER ASSEMBLY AND SYSTEM FOR AQUACULTURE

BACKGROUND OF THE INVENTION

Claim of Priority

This application is a Continuation-in-Part of U.S. Patent having Ser. No. 16/916,986, which was filed on Jun. 30, 2020, which is a Continuation-in-Part of U.S. Patent having Ser. No. 15/867,100 which was filed on Jan. 10, 2018, which matured into U.S. Pat. No. 10,034,461 and issued on Jul. 31, 2018, which was a Continuation of U.S. Patent having Ser. No. 15/157,296 which was filed on May 17, 2016, which matured into U.S. Pat. No. 10,694,722 and issued on Jun. 30, 2020, which claims benefit to Provisional Application having Ser. No. 62/165,144 filed on May 21, 2015. Finally, this application also claims priority to U.S. Provisional Patent Application having Ser. No. 62/975,410, filed on Feb. 12, 2020. Each of the above applications are incorporated by reference herein in their entirety.

Field of the Invention

The present invention is directed to a transfer assembly and system associated with an aquaculture system operative for the transfer of marine life between storage facilities, wherein the plurality of storage facilities are disposed and structured to contain and develop marine life at different stages of growth.

DESCRIPTION OF THE RELATED ART

Currently, there is a recognized alarming decline in conventional fisheries, which in turn is based on overfishing and harmful environmental happenings. At present, the demand for seafood exceeds the supply available from such conventional fisheries and it is predicted that with an increased world population, the demand for seafood will double in the immediate future. Accordingly, the inability of conventional fisheries to meet such an increasing demand for seafood has resulted in an equally increasing need for aquaculture systems or "fish farms" capable of significantly high volume of seafood production. In at least some instances, systems of this type are physically located in a geographical location having direct access to sea water. In turn, this may have a derogatory effect on the environment in the form of pollution of coastal areas.

Accordingly, present technology of aquaculture systems provides for the raising of various fish species such as, but not limited to, Atlantic salmon in sufficient quantities and at expected quality levels to overcome the problems of the type set forth above. In doing so, various combinations of oxygenation, degassing, particulate removal, bio-filtering, sanitizing, flocculation, and denitrification may be employed. Moreover in aquaculture systems of the type referred to including, but not limited to, recirculating aquaculture systems (RAS), eggs may be obtained from an external supplier which are then processed and developed over an extended period of time. As such, aquaculture systems of the type referred to may include one or more production lines to assure biosecurity and the possibility of producing under different standards in each. The specifications, in terms of number of tanks, volumes, flow rates etc. may vary for the different systems and/or production lines involved.

As such, aquaculture systems and/or RAS facilities of the type referred to herein can comprise a plurality of tanks, containers, etc. to maintain and process the fish/marine life during the extended developmental period. During such development, the fish are transferred between such developmental stages including the tanks, containers, etc. associated there with. However, care must be taken in order to maintain appropriate and preferred environmental conditions during the entire developmental process. Maintaining the preferred and intended environmental conditions facilitates proper development of the processed marine life, at least in terms of size, flavoring, etc. One such environmental factor may be the maintenance of the temperature of the containment water as well as the marine life contained therein. Maintenance of proper temperature may be of particular concern due to the fact that such aquaculture systems, including the plurality of different tanks, containers, etc. associated therewith, may be extremely large and be disposed in spaced relation to one another, even when such systems are located in a substantially common geographical area. Therefore, in terms of maintaining effective environmental standards, the transferring of the marine life between the different tanks, based on their stages of development may be problematic.

Accordingly, there is a need in the industry associated with aquaculture systems, including recirculating aquaculture systems, for a system for transferring marine life between a plurality of storage facilities typically in the form of, but not limited to, various sized tanks. Such tanks or storage facilities are structured to maintain containment water appropriate for the growth stage of the marine life being contained and/or transferred. Further, such a preferred and proposed transferring system may include a transfer assembly comprising and or defining a path of fluid flow interconnecting successively communicating ones of the plurality of storage facilities in fluid communication with one another. Such a proposed transfer assembly will facilitate the movement of the marine life between the successively communicating storage facilities, when the marine life is ready for development at a different, succeeding stage of growth.

Also, the proposed transfer assembly is disposed and structured to facilitate maintenance of the preferred and required environmental conditions by disposing at least a majority of a length of the path of fluid flow between successively communicating ones of the plurality of storage facilities beneath independent ground levels on which the different storage facility/tanks are located. Disposition of the one or more paths of fluid flow in such a location serves to facilitate maintenance of the temperature of the containment water and or marine life disposed along the one or more paths of fluid flow. Such maintenance of intended environmental conditions, specifically including temperature, is due at least in part to the shielding or insulating of the path of fluid flow from ambient weather conditions located at or above ground level on which the plurality of storage facilities are disposed. The subsurface location of the path of fluid flow is also disposed out of heat transferring relation to a proximate water table, aquifers and/or subsurface water saturated soil, and order to avoid heat transfer therebetween.

SUMMARY OF THE INVENTION

The present invention is directed to the transferring of marine life between different storage facilities in an aquaculture system or facility including, but not limited to a recirculating aquaculture system (RAS). In more specific terms, the marine life including various species of fish may be transferred between successively communicating storage facilities based, at least in part, on the different stages of growth to which the marine life or fish must be exposed in order to reach a harvesting stage or size.

In more specific terms, a plurality of storage facilities are included in the aquaculture system, each being structured to include containment water for the marine life. Further the containment water and the marine life are maintained at or within a predetermined temperature range to facilitate development and growth, while maintaining a desirable flavor in the marine life when eventually harvested. It is noted that the term "storage facility" may typically comprise a tank or like container in which the marine life is maintained for a predetermined period of time depending upon the developmental growth stage for which the storage facility/tank is intended. As such, the plurality of storage facilities/tanks may vary in structure, dimension and resulting volume of containment water maintained therein. It is also recognized that each developmental growth stage of may involve the processing of extremely large number of fish and as such a plurality of storage facilities/tanks may define each developmental growth stage of processing.

By way of a non-limiting example in an aquacultural system, which may comprise an RAS, Roe are placed in the hatchery and hatched. When the resulting fingerlings are ready, they will be moved to the fry and start feeding. Start feeding tanks may appropriate for marine life including a size in 0.12 grams to 0.14 grams, wherein the size out is preferably three grams. The amount of time in this developmental stage of the system is up to 2.5 to 3 months). Based on the volume of marine life being developed, these start feeding tanks may comprise a plurality of tanks, that are generally about one meter deep. Storage facilities or tanks having different dimensions than those stated are also efficient to operate for start feeding stage.

The fish are grown up to three grams in size and transferred and graded to the Parr tanks. When transferred they are graded a first time. Parr tanks include marine life having a size in of 3 grams and they size out 20 grams. The time involved in this growth stage of the system is up to 2.5 to 3 months. The marine life stay in the Parr tanks until they are 20 grams and then they are transferred to smolt tanks. The marine life are graded in this transfer as well. Smolt tanks are adapted to receive and process marine life having a size in of 20 g and a size out 70 g. The developmental time of this growth stage of the system is up to 3 months. When the marine life reach 70 grams they are transferred to the post smolt system.

Post Smolt tanks are structured to process marine life having a size in 70 g and a size out of 200 g. The developmental time in this growth stage of the system time in system is up to 3 to 5 months. Subsequently, at 200 to 300 grams in size, the marine life are transferred to the on-growing systems. On-growing systems involve in size of 200 g and a size out 5250 g. Time involved in this developmental stage of the system is up to 12 months. The fish may be held in these tanks for up to 32 weeks. The final weight in is 1.9 kg. This process may take six months so as to leave an extra buffer in the production system. The fish will be graded upon transfer and eventually transferred to the on growing tanks. The fish can be held in up to 24 weeks. The final weight in the tanks is 5.25 kg. The on growing tanks may be operated on a flow through basis to remove any potential off-flavor from the fish. In addition, one or more tanks may be maintained for the containment of fish for a period of time in order to remove off flavor.

Accordingly, it is apparent that in the maintenance and processing of marine life through different developmental stages, including growth stages, involves the transfer of the marine life between the storage facility tanks associated with each of the developmental and/or growth stages is a factor.

Further, it is equally necessary to maintain proper environmental conditions to which the storage facilities/tanks and marine life are disposed. Such environmental conditions specifically include, but are not limited to, temperature.

By way of example, the temperature range at least some of the storage facility/tanks, at different ones of the developmental growth stages and marine life, may be in the range of generally about 14° C. Therefore, it is desirable to maintain the same temperature range of the marine life during the transfer process between the storage facility/tanks associated with the different developmental stages.

In light of the above, the system of the present invention is directed to the transferring of marine life within an aquaculture facility which could include, but not be limited to, a recirculating aquaculture system or facility. Accordingly, the system of the present invention includes a plurality of storage facilities each including containment water for marine life which is maintained within a predetermined temperature range. As also indicated above, the plurality of storage facilities/tanks are structured to maintain the processed marine life at different developmental stages including growth stages. Further, each developmental/growth stage may comprise a plurality of the storage facilities/tanks, based at least in part on the large volume of marine life being processed over a given developmental period of time.

Also, the plurality of storage facilities/tanks may be spaced and/or segregated from one another, such as being located in different buildings, shelters, etc. As indicated, aquaculture systems of the type referred to herein may be extensive. As a result, while the referred to aquaculture system may be located in the same location within a common geographical area, the one or more storage facilities/tanks associated with each developmental growth stage (hatchery, Parr tanks, smolt tanks, post smolt tanks, on growing tanks, etc.) may he built, disposed and located on independent ground surface levels. It is further noted that the individual storage facilities may also be disposed on appropriate supporting foundations such as, but not limited to concrete slabs etc., wherein such supporting foundations are formed, constructed, disposed and in turn supported by the aforementioned and further described independent ground levels, which may be at the same or different heights.

The system of the present invention further comprises a transfer assembly comprising a path of fluid flow interconnecting at least two, but more practically an additional plurality of storage facilities/tanks in successively communicating relation with one another. Also, at least a majority of a length of the path of fluid flow defining the transfer assembly is disposed beneath the independent ground levels between the communicating storage assembly/tanks at a predetermined depth. The predetermined depth is sufficient to substantially maintain the path of fluid flow within the predetermined temperature range by virtue of not exposing the path of fluid flow to the above ground ambient weather conditions.

The transfer assembly and/or portions thereof which define the path of fluid flow may be in the form of one or more conduits, pipes, etc. dimensioned to transfer a predetermined and/or appropriate volume of containment water and marine life between at least two but more practically a greater number of the plurality of successively communicating storage facilities. As clearly indicated, the transfer of the marine life will be based at least in part on the different developmental/growth stages to which the marine life must be exposed to reach a size and quality appropriate for harvesting.

Moreover, in order to substantially maintain the containment water and marine life within the preferred, predetermined temperature range the predetermined depth at which the path of fluid flow is located is further disposed at a spaced distance from and/or above a water table which is proximate to the path of fluid flow. Such a spaced distance from the water table or aquifer should be sufficient to eliminate or at least minimize heat transfer from the water table, aquifer and water associated therewith, to the path of fluid flow and the containment water/marine life passing there through.

For purposes of clarity it is generally recognized that the water table is the upper surface of a saturated zone, where the subsurface ground level is saturated with water. Further, the water table is a surface where the water pressure head is equal to the atmospheric pressure and may be visualized as the surface of the subsurface materials that are saturated with groundwater. It is also recognized that groundwater may be from precipitation or from groundwater flowing into and aquifer. In areas with sufficient precipitation, water infiltrates the soil, passing through unsaturated zones. In more specific terms and as used herein the water table is a water saturated subsurface and made be directly associated with aquifers in certain geographical regions.

It is further recognized that in certain geographical regions the depth or location of the water table may vary based on seasons. Such seasonal variance ma be due to a greater or lesser rainfall, exposure to aquifers or other water sources and other factors. By way of non-limiting example, during a rainy season in a given geographical area, the water table may be raised closer to the normal, original or exposed ground level surface. Therefore, the subsurface depth at which the transfer assembly and path of fluid flow is buried is sufficient to accommodate seasonal variance of the water table, again dependent on the weather and other conditions which may affect the depth or level of a proximate water table.

It is further recognized that in some geographical areas the water table, aquifer or below ground saturated soil is relatively close to the above exposed ground surface level on which the plurality of storage facilities/tanks may be disposed/supported. By way of example, the state of Florida includes a natural aquifer system (Floridan aquifer) as well as a relatively shallow water table located relatively close to the exposed, natural ground surface. Accordingly, in order to maintain the buried transfer assembly and defined path of fluid flow out of heat transferring relation to the water associated with the water table, aquifer system, etc., the one or more storage facilities/tanks defining each of the developmental growth stages of the marine life may be raised above the natural exposed ground surface level to a revised ground level.

Accordingly, as used herein, the term "independent" ground level may refer to the natural or normal, outer exposed ground level on which the plurality of storage facilities are disposed. In contrast, the term "revised" ground level is meant to describe a raised, functionally operative ground level on which the plurality of storage facilities are disposed. As such, the "revised" ground may be built on top of the original "independent" ground level. Further, the "revised" ground level is is man-made and constructed to be at least a minimum height above the original normal or "independent" ground level as well as the proximate water table. Further, the "revised" ground level is constructed and operatively utilized in geographical areas where the proximate water table is relatively shallow and/or where the seasonal variance thereof serves to raise the water table to a shallow depth, such as in geographical regions including, but not limited to, Florida, as set forth above.

It is to be further noted that each of the independent ground levels on which the storage facilities are disposed may have a common height or may have different heights relative to the proximate water table. Due at least in part to the fact that the revised ground levels may be built on top of the independent ground levels, the revised ground levels may also have a common height or may differ in height.

Therefore, the revised ground levels on which the storage facilities are disposed are disposed, physically formed and/or constructed at a raised or predetermined increased height above a corresponding normal, natural and exposed independent ground level. Moreover, the revised ground levels of each of the plurality of storage facilities/tanks should be sufficient to facilitate the disposition of the path of fluid flow at a sufficient predetermined depth concurrent to the path of fluid flow being disposed a predetermined spaced distance above or from an aquifer and or water table, in order to facilitate maintenance of the predetermined temperature of the path of fluid flow.

In establishing an appropriate subsurface disposition of the transfer assembly, including the path of fluid flow, between the ground level and the water table, aquifer, etc. reference will be made to a recognized standard specifically including the North American Vertical Datum of 1988 (NAVD 88). In more specific terms, NAVD 88 is the vertical datum for orthometric heights established for vertical control surveying in the United States, based on the General Adjustment of the North American Datum of 1988. NAVD 88 was affirmed in 1993 as the official vertical datum in the National Spatial Reference System (NSRS) for the contiguous United States and Alaska. Further, the NAVD 88 comprises a leveling network on the North American Continent, ranging from Alaska through Canada, across the United States, being affixed to a single origin point on the continent. In defining the NAVD 88, is it is calculations are involved for the location of the local Mean Sea Level (MSL).

It is further recognized that the NAVD 88 will be replaced with a new geometric reference frame and Geo potential datum and 2022. Such new reference frames will rely primarily on global navigation satellite systems (G and SS) such as the Global Positioning System (GPS) as well as other gravimetric models. However, as at least one point of reference, to be described in greater detail hereinafter the NAVD 88 will be used as represented in detail hereinafter.

While the system of the present invention is described as relating to an aquaculture system it is equally applicable for use with a recirculating aquaculture system and the various storage facilities/tanks operatively associated therewith.

Accordingly, these and other objects, features and advantages of the present invention will become clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As schematically represented in the accompanying Figures, the present invention is generally represented as 10 and is directed to the transferring of marine life within an aquaculture system, between a plurality of storage facilities 12, 13, 14, 15, etc. based, at least in part, on a stage of growth and/or development of the marine life while being processed. For purposes of clarity, the storage facilities 12-15, etc. each include structures such as, but not limited to, tanks maintaining containment water for the marine life which are adequate in number and dimension to process the marine life during a particular stage of growth and/or development. Also, as used herein the term aquaculture system is meant to include, but not be limited to, a recirculating aquaculture system (RAS).

Figure 1:
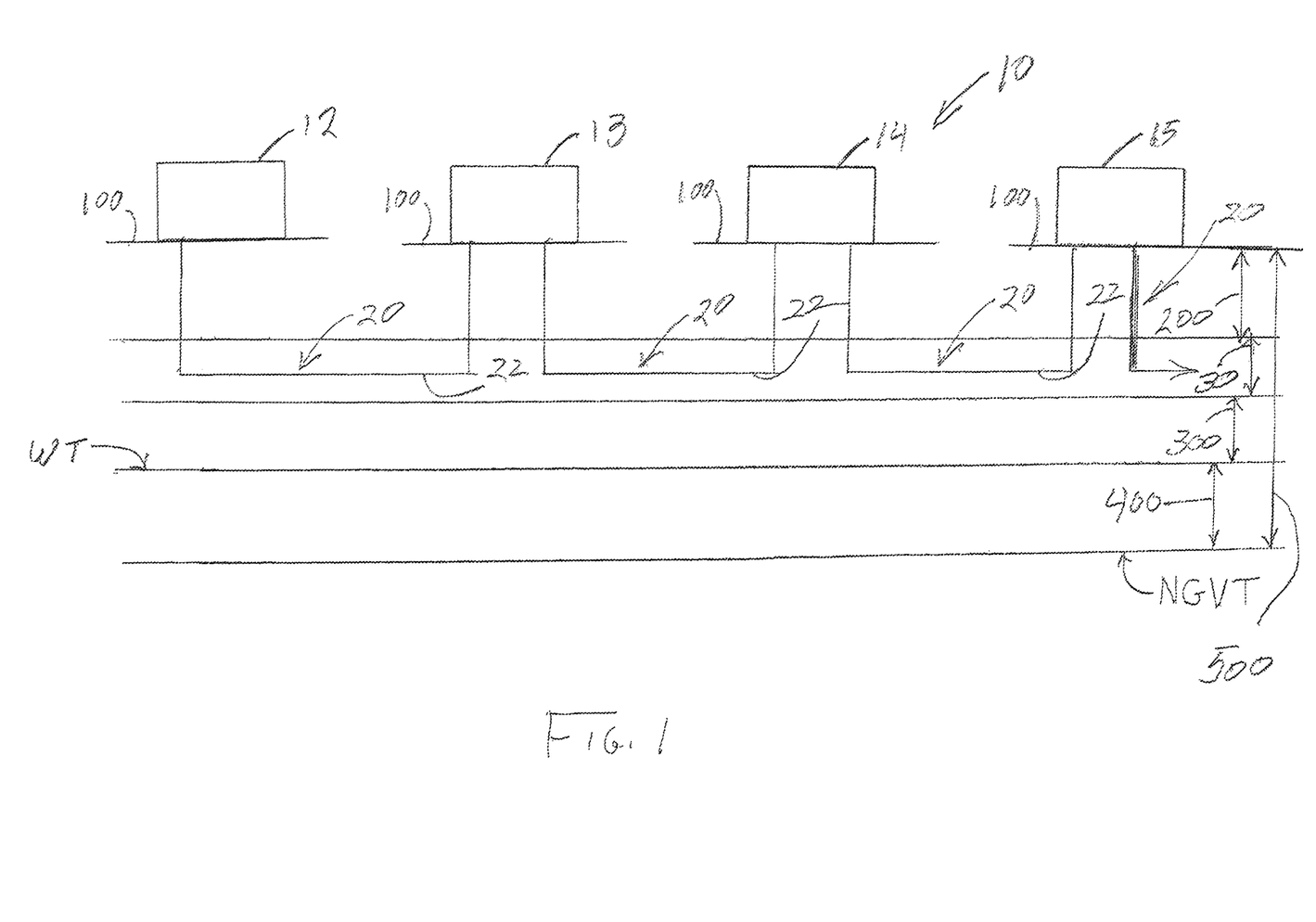
FIG. 1 is a schematic representation of one embodiment of the system of the present invention including a plurality of storage facilities disposed and supported at independent normal, exposed or natural ground levels of a given geographical area.
Figure 2:
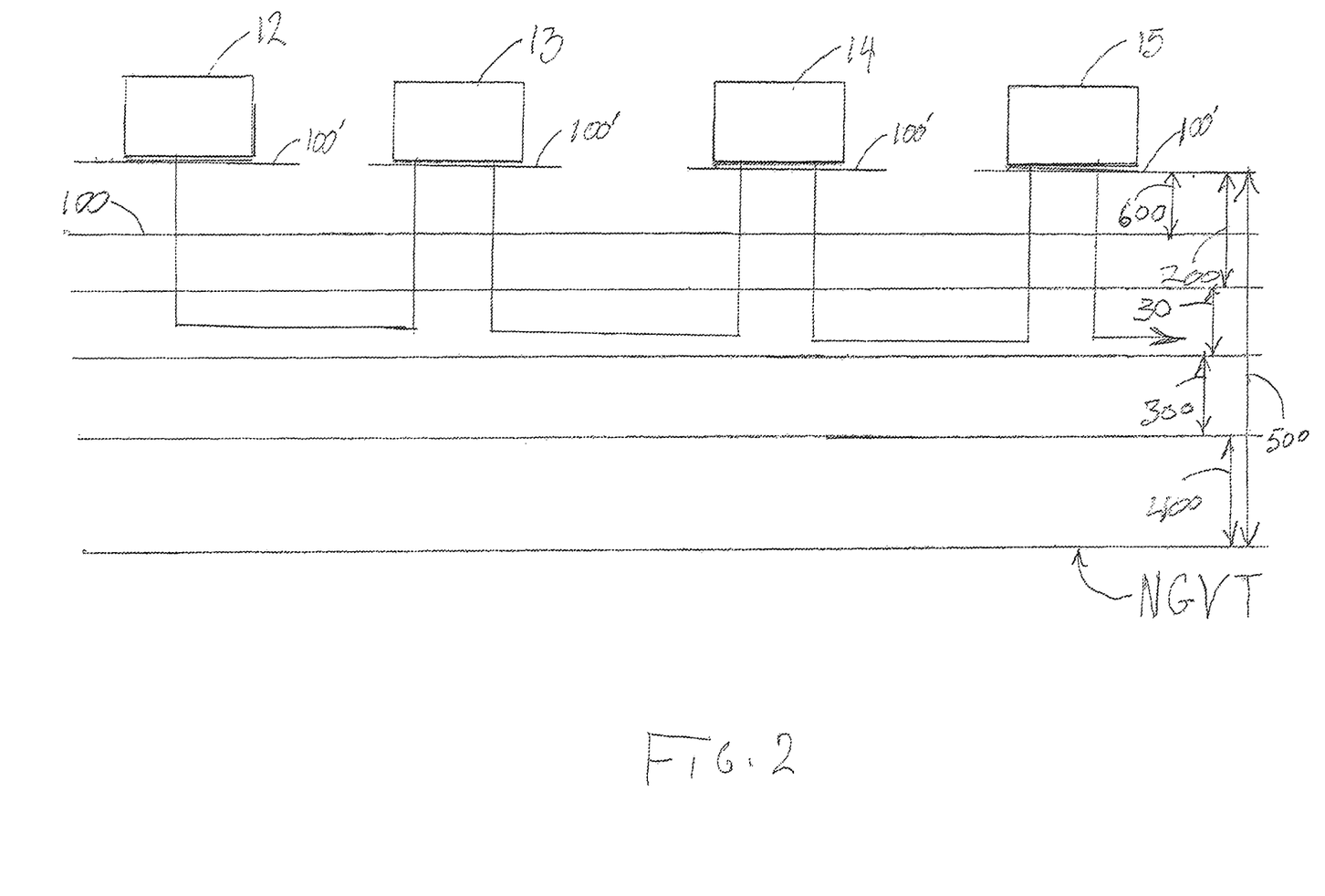
FIG. 2 is a schematic representation of another embodiment of the system of the present invention including a plurality of storage facilities disposed and supported at revised ground levels, above a normal, exposed or natural ground level of a given geographical area.

Further, in the different embodiments of FIGS. 1 and 2 each of the storage facilities 12-15, etc. may include a single tank or like containment structure or a plurality of such tanks or containment structures dependent, at least in part, on the quantity and/or size of the marine life being processed during respective growth stages. By way of non-limiting example, the plurality of storage facilities/tanks 12-15, etc. could include hatcheries, Parr tanks, smolt tanks, post smolt tanks, growing tanks, etc., each representative of the different stage of growth of the marine life. Also, the plurality of storage facilities 12-15, etc. could vary in number and be used for other developmental processing of marine life, rather than being associated with a specific growth stage as indicated.

Therefore, as represented in both FIGS. 1 and 2, the transfer assembly and/or system 10 of the present invention includes the plurality of storage facilities 12-15, etc. each including containment water for marine life. In order to assure and facilitate proper growth and other processing of the marine life, the containment water within the plurality of storage facilities 12-15, etc. is maintained within a predetermined temperature range. Such predetermined and/or preferred temperature is in the range of about 14° C. As also indicated above, the plurality of storage facilities/tanks 12-15, etc. maintain the marine life at different stages of growth, wherein each developmental growth stage may comprise one or more storage facilities/tanks, based at least in part on the volume and size/age of marine life being processed over a given developmental period of time.

Also, the plurality of storage facilities/tanks 12-15, etc. may be spaced and/or segregated from one another, such as being located in different buildings, shelters, housings, etc. As indicated, aquaculture systems of the type referred to herein may be extensive, again based at least in part on the volume of marine life being processed over a comparatively long developmental time period. As a result, while the aquaculture system may be located in the same location within a common geographical area, the one or more storage facilities/tanks 12-15, etc. associated with each developmental growth stage (hatchery, Parr tanks, smolt tanks, post smolt tanks, growing tanks, etc.) may be built, supported, disposed and located on, different independent ground levels 100, as represented in FIG. 1 or revised ground levels 101', as represented in FIG. 2. Moreover, the different, independent ground levels 100 may be the same height or different heights due at least in part to the segregated disposition of the storage facility/tanks 12-15, etc. similarly, in the embodiment of FIG. 2 the ground levels 100' may be the same height or different heights.

As set forth herein, it is emphasized that the term "independent ground level", as at 100, may refer to the natural or normal outer, exposed ground level, at a geographical location, on which the plurality of storage facilities 12-15, etc. are disposed. In contrast, the term "revised ground level" as at 100', is meant to describe an operative ground level, at a given geographical location, on which the plurality of storage facilities 12-15 etc. are disposed and which is man-made and/or constructed to be at least a minimum height above the original normal or "independent ground level" 100. As such, the "revised ground level" 100' is constructed, formed and operatively utilized in geographical areas where the proximate water table is relatively shallow and/or where the seasonal variance thereof serves to raise the water table to a shallow depth such as in, but not limited to, geographical regions such as Florida, as set forth above.

As also represented in FIGS. 1 and 2, the assembly and/or system 10 of the present invention further comprises a transfer assembly generally indicated as 20 comprising a path of fluid flow 22, both of which are schematically represented, interconnecting successively communicating ones of the plurality of storage facilities/tanks 12-15, etc. in fluid communication with one another. As indicated, the path of fluid flow 22 may extend between two successively communicating storage facility/tanks, such as at 12 and 13. In the alternative, the path of fluid flow 22 may be accurately described herein as including one or more different fluid flow paths extending between different ones of the successively communicating storage facilities/tanks, such as between 12-13, 13-14, 14-15, etc. further, conduits, pipes or like structures may define the path of fluid flow 22 as being operatively associated with the transfer assembly 20.

With further reference to FIGS. 1 and 2, at least a majority of a length of the path(s) of fluid flow 22 defining the transfer assembly 20 is disposed beneath the independent ground levels 100 and 100', between the successively communicating storage assembly/tanks 12-13, 13-14, 14-15, etc. at a predetermined minimum depth 200. The predetermined minimum depth 200 is preferably in the range of 3 feet-4 feet and is sufficient to facilitate the maintenance of the path of fluid flow 22 within the predetermined temperature range of generally about 14° C. This is due to the fact that the path(s) of fluid flow 22 are not exposed to the sun or other above ground weather conditions.

As indicated, the transfer assembly 20 and/or portions thereof which define the path(s) of fluid flow 22 may be in the form of one or more conduits, pipes, etc. dimensioned to transfer a predetermined volume of containment water and marine life successively between the plurality of storage facilities 12-15, etc., based on the different growth stages of the marine life being transferred. By way of non-limiting example, the conduits, pipes, etc. defining the path(s) of fluid flow 22 may have a diameter in the range of about 8 inches to about 30 inches. The smaller diameter conduits, pipes, etc. defining the path(s) of fluid flow 22 may be used to transfer an appropriate volume of containment water and included marine life, wherein the marine life will be smaller in size by virtue of being in an early growth stage. In contrast, the larger diameter conduits, pipes, etc. may be utilized to transfer containment water and included marine life which are larger and/or at a size appropriate for harvesting.

Accordingly, with continued reference to FIGS. 1 and 2, the subsurface area generally indicated as 30 represents the location in which the different size conduits, pipes, etc. (schematically represented) defining the path(s) of fluid flow 22 are located. This subsurface area 30 should be properly located below the independent ground level 100 and/or revised ground level 100', as described in greater detail hereinafter and should be sufficient in size, such as in the range of generally about 2½ feet, to accommodate the different sizes of the conduits, pipes, etc., having a preferred diameter of generally between 8 inches to 30 inches, which define the path(s) of fluid flow 22.

In order to further facilitate maintenance of the containment water and marine life within the preferred, predetermined temperature range of generally about 14° C., while in and traveling along the path(s) of fluid flow 22, the predetermined depth 200 (generally about 3 feet to 4 feet) at which the location area 30 of the path(s) of fluid flow 22 is located, is further disposed at a spaced distance 300 from and above a local water table WT. Such a spaced distance 300 from the water table WT is preferably in the range of at least 2½ to 3 feet. While the spaced distance of the transfer assembly 20 from the water table WT may vary, such distance 300 should be sufficient to eliminate or at least minimize heat transfer from the water within an at least partially defining the water table WT to the containment water and marine life in the path(s) of fluid flow 22.

In establishing an appropriate disposition of the transfer assembly 20, including the path(s) of fluid flow 22, between each of the ground levels 100, 100' and the water table WT, aquifer, etc., reference will be made to a recognized standard including the North American Vertical Datum of 1988 (NAVD 88). In defining the NAVD 88 calculations are involved for the location of the local Mean Sea Level (MSL). As set forth in greater detail herein above.

Accordingly, the embodiment of FIG. 1 represents an implementation of the transfer system 10 of the present invention in a geographical area where the water table WT is normally, historically or typically located a sufficient distance below the natural, exposed ground surface, defined herein as the independent ground level 100. In such a geographical location, the depth of the water table WT is sufficient to maintain the transfer assembly 20 and path(s) of fluid flow 22 a sufficient distance 200 below the independent ground levels 100 and above the water table WT, in order to facilitate maintenance of the path(s) of fluid flow 22 within the preferred temperature range of generally about 14° C. In such a geographical location, the water table WT is located at a recognized distance 400, generally in the range of about 3 feet, above the NGVT and further wherein the NGVT is located an appropriate distance 500, generally in the range of at least 11 feet, below the natural, exposed ground surface, defined herein as the independent ground level 100.

The embodiment of FIG. 2, recognizes that in some geographical areas the water table WT, aquifer or below ground saturated soil is relatively shallow and comparatively close to the original or normal, exposed ground surface level 100 on which the plurality of storage facilities/tanks 12-15, etc. are operationally disposed/supported, as in the embodiment of FIG. 1. By way of example, the state of Florida includes a natural aquifer system (Floridan aquifer) as well as a shallow water table WT located in relatively close proximity to the original or normal exposed ground surface 100. Accordingly, in order to maintain the buried transfer assembly 20 and defined path(s) of fluid flow 22 out of heat transferring relation to the water table WT, the plurality of storage facilities 12-15, etc. may be disposed and supported on a raised, exposed ground surface level represented here in as a "revised ground level" 100'.

As such, the raised, revised ground levels 100' may be man-made and constructed, such as by using ground or soil moving equipment or other techniques, so as to be disposed at a predetermined minimum height 600 above a corresponding normal or natural, exposed ground level, which would normally be at a height equivalent to the independent ground level 100. It is recognized that the predetermined minimum height 600 of the revised ground level 100' may vary dependent on a particular geographical area, but in each practical application, the revised ground level 100' of each of the plurality of storage facilities/tanks 12-15, etc. should be sufficient to facilitate the disposition of the path(s) of fluid flow 22 at a sufficient predetermined depth of generally of at least about 2½ feet to 3 feet below the revised ground levels 100'. Concurrently the path(s) of fluid flow 22 and the area 30 in which they are positioned, should be disposed a predetermined spaced distance 300, generally about a predetermined minimum of 3 feet to 4 feet, above a proximate water table WT. Moreover, as also set forth above with regard to the embodiment of FIG. 1, the disposition of the transfer assembly 20 and path(s) of fluid flow 22 will facilitate the maintenance of the predetermined temperature of and within the path(s) of fluid flow 22 at the predetermined temperature of generally about 14° C.

As set forth above with regard to the embodiment of at least FIG. 2, in such a geographical location where the water table WT is relatively shallow, as set forth above, it generally considered to be located at a recognized distance 400, of generally about 7 feet, above the NGVT. Further, the height of the revised ground levels 100' should be such that the NGVT standard is located an appropriate distance 500, generally about 11 feet, below the revised ground level 100'.

It is further noted that while the system of the present invention is described as relating to an aquaculture system it is equally applicable for use with a recirculating aquifer system and the various storage facilities/tanks operatively associated there with.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system for transferring marine life within an aquaculture facility, said system comprising:
   a plurality of storage facilities each including containment water for marine life, maintained within a predetermined temperature range,
   said plurality of storage facilities including at least a first and a second storage facility,
   said first and said second storage facilities segregated and disposed at independent ground levels,
   a transfer assembly disposed in interconnecting relation between said first and second storage facilities,
   said transfer assembly comprising a path of fluid flow from said first storage facility to at least said second storage facility,
   at least a majority of a length of said path of fluid flow disposed beneath the independent ground levels at a predetermined depth, and said predetermined depth sufficient to substantially maintain said path of fluid flow within said predetermined temperature range.

2. The system as recited in claim 1 wherein said transfer assembly comprises a conduit structured and dimensioned to contain and transfer a predetermined volume of containment water and marine life from said first storage facility to said second storage facility.

3. The system as recited in claim 1 comprising said predetermined depth of said path of fluid flow being disposed at a spaced distance above a proximate water table.

4. The system as recited in claim 3 wherein said path of fluid flow is disposed at said spaced distance, out of heat transferring relation to the water table.

5. The system as recited in claim 3 wherein said path of fluid flow is disposed at said spaced distance, out of heat transferring relation to a seasonal variance of the water table.

6. The system as recited in claim 1 wherein the independent ground level of at least one of said first and second storage facility is defined by a revised ground level, said revised ground level disposed and structured at a predetermined height above a corresponding normal ground level.

7. The system as recited in claim 6 wherein said predetermined height of said revised ground level is disposed above the proximate water table a distance sufficient to define a disposition of said path of fluid flow at said predetermined depth, out of heat transferring relation to the water table.

8. The system as recited in claim 1 wherein the independent ground level of each of said plurality of storage facilities is defined by a revised ground level, said revised ground level disposed and structured at a predetermined height above a corresponding normal ground level.

9. The system as recited in claim 8 wherein said predetermined height of each of said revised ground levels is disposed above the water table a distance sufficient to define a disposition of said path of fluid flow at said predetermined depth out of heat transferring relation to the water table.

10. The system as recited in claim 1 wherein said plurality of storage facilities are included within and define a portion of a recirculating aquaculture system.

11. A system for transferring marine life within an aquaculture facility, said system comprising:
    a plurality of storage facilities each including containment water for marine life, maintained within a predetermined temperature range,
    said plurality of storage facilities segregated from one another and disposed at revised ground levels,
    said plurality of storage facilities disposed and structured to contain marine life at different stages of growth,
    a transfer assembly comprising a path of fluid flow dimensioned to transfer aquaculture there along, said path of fluid flow interconnecting successively communicating ones of said plurality of storage facilities in fluid communication with one another,
    at least a majority of a length of said path of fluid flow disposed beneath the revised ground levels at a predetermined depth, and
    said predetermined depth sufficient to substantially maintain said path of fluid flow within said predetermined temperature range.

12. The system as recited in claim 11 wherein said transfer assembly comprises a conduit structure dimensioned to transfer a predetermined volume of containment water and marine life between successively communicating ones of said plurality of storage facilities, based on different growth stages of marine life being transferred.

13. The system as recited in claim 11 comprising said predetermined depth of said path of fluid flow being disposed at a spaced distance above a proximate water table.

14. The system as recited in claim 13 wherein said path of fluid flow is disposed at said spaced distance, out of heat transferring relation to the water table.

15. The system as recited in claim 13 wherein said path of fluid flow is disposed at said spaced distance, out of heat transferring relation to a seasonal variance of the water table.

16. The system as recited in claim 11 wherein said revised ground level disposed and structured at a predetermined height above a corresponding natural ground level.

17. The system as recited in claim 16 wherein said predetermined height of said revised ground level is disposed above the proximate water table a distance sufficient to define a disposition of said path of fluid flow at said predetermined depth, out of heat transferring relation to the water table.

18. The system as recited in claim 11 wherein the independent ground level of each of said plurality of storage facilities is defined by a revised ground level, said revised ground levels disposed and structured at a predetermined height above a corresponding normal ground level.

19. The system as recited in claim 18 wherein said predetermined height of each of said revised ground levels is disposed above the water table a distance sufficient to define a disposition of said path of fluid flow at said predetermined depth and out of heat transferring relation to the water table.

20. The system as recited in claim 11 wherein said plurality of storage facilities are included within and define a portion of a recirculating aquaculture system.

\* \* \* \* \*